Jan. 3, 1950 E. ORSHANSKY, JR 2,493,418
VARIABLE SPEED TRANSMISSION
Filed July 16, 1946 6 Sheets-Sheet 2
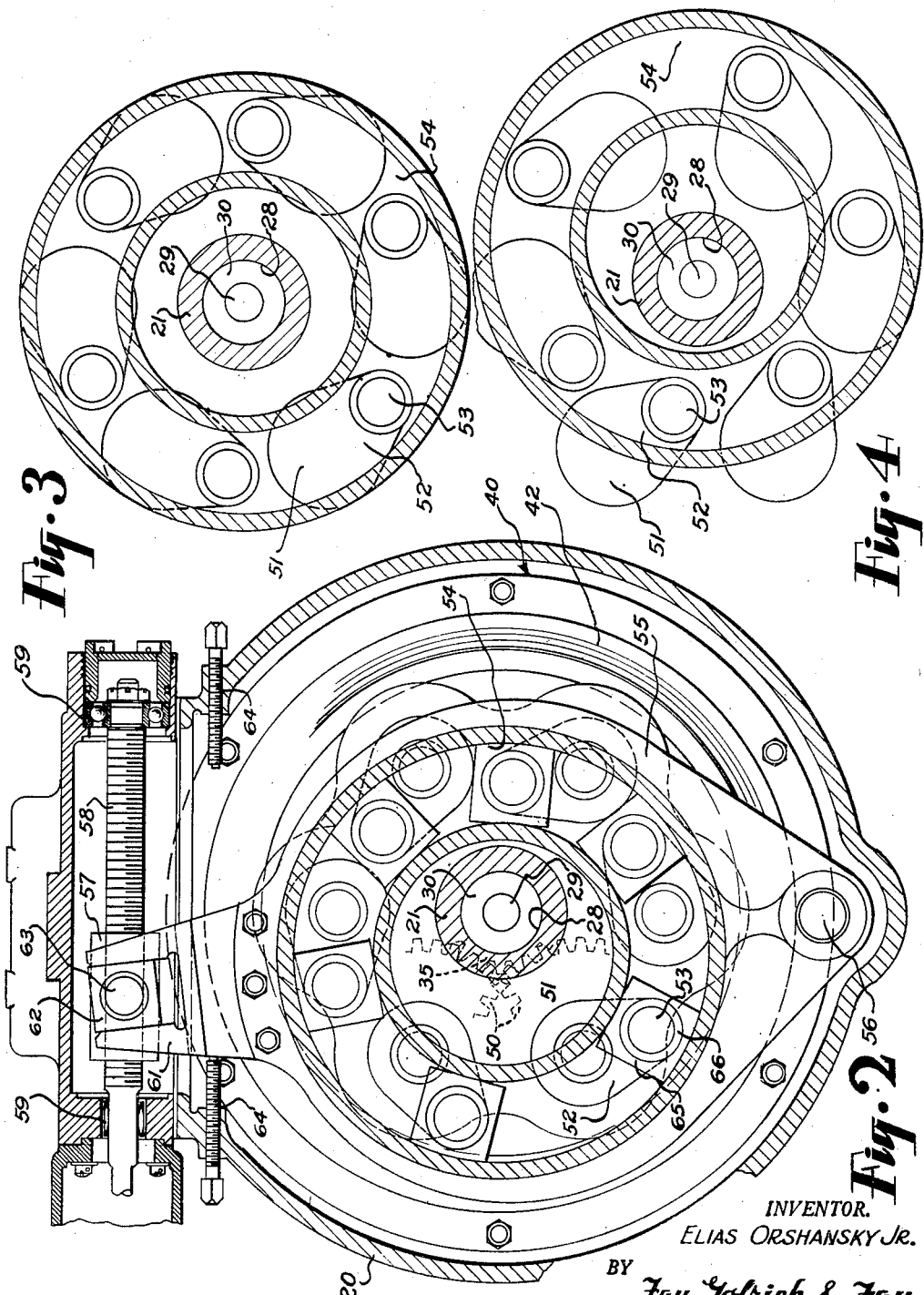
INVENTOR.
ELIAS ORSHANSKY JR.
BY
Fay Jobrick & Fay
ATTORNEYS

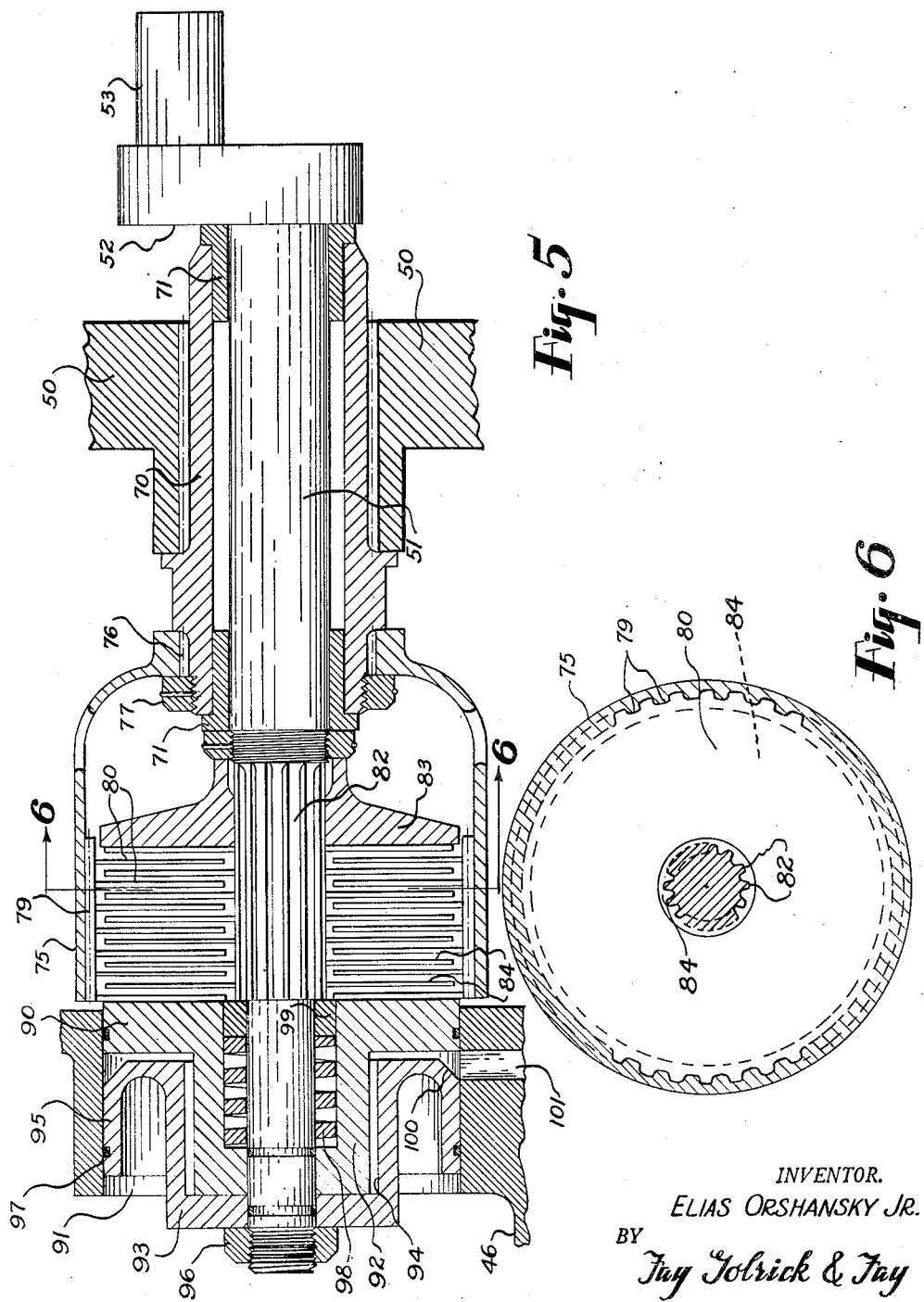

Jan. 3, 1950 E. ORSHANSKY, JR 2,493,418
VARIABLE SPEED TRANSMISSION
Filed July 16, 1946 6 Sheets-Sheet 4

INVENTOR.
ELIAS ORSHANSKY JR.
BY
Fay Jolrick & Fay
ATTORNEYS

Jan. 3, 1950     E. ORSHANSKY, JR     2,493,418
VARIABLE SPEED TRANSMISSION

Filed July 16, 1946     6 Sheets-Sheet 5

INVENTOR.
ELIAS ORSHANSKY JR.
BY Fay Jobrick & Fay
ATTORNEYS

Jan. 3, 1950     E. ORSHANSKY, JR     2,493,418
VARIABLE SPEED TRANSMISSION

Filed July 16, 1946     6 Sheets-Sheet 6

INVENTOR.
ELIAS ORSHANSKY JR.

BY Fay Jolrick & Fay

ATTORNEYS

Patented Jan. 3, 1950

2,493,418

UNITED STATES PATENT OFFICE 2,493,418

VARIABLE-SPEED TRANSMISSION

Elias Orshansky, Jr., Cleveland, Ohio, assignor to Donald W. Hornbeck, Shaker Heights, Ohio Application July 16, 1946, Serial No. 683,870

12 Claims. (Cl. 74—125.5)

1

The present invention relates to a variable speed mechanical transmission, and more particularly to a gear transmission in which a plurality of driven elements, such as planetary gears, are meshed with a sun gear, and the planetary gears are each intermittently engaged and disengaged from driving relation with associated, crank operated oscillating shafts, during a certain phase of rotation of the crank shafts, so that a substantially uniform and uninterrupted torque effort is transmitted from the oscillating crank shafts to the sun gear through the planetary gears.

In my prior application Serial Number 626,552, filed November 26, 1945, I disclosed a dual clutch mechanism adaptable to engage and disengage such planetary gears and their respective oscillating crank shafts from driving relation, and six of these clutch mechanisms in the course of their revolving movement about the axis of the driving and driven shafts were successively actuated by a stationary cam. It has since been determined that in some transmission speed requirement environments, particularly in the high speed field, such as 3000 R. P. M. on the input shaft, the disclosed clutch springs and the actuating means of the clutching mechanism for the respective gears could not be adjusted with such uniformity and finality as to be operated by a single or common cam source without careful and costly calibration.

The object of the present invention is the provision of simplified clutching mechanisms which will effect uniformally a driving engagement and disengagement of each of the planetary gears with their respective oscillating crank shafts at preselected points in th arc of the axial rotation of the crank shafts and their associated planetary gears.

Another object of the invention is to provide means for actuating the clutching mechanisms with uniform rapidity throughout substantially the entire range of speed of the transmission.

A further object of the invention is the provision of hydraulic means which will be uniformally effective throughout the entire range of speeds of the driving or input end of the variable speed transmission mechanism for causing engagement and disengagement of the progressively operated clutch mechanisms of the planetary gears relative to the member driven by these gears so that an overlap in operation of the clutch mechanisms will always be effected.

A more specific object of the invention is to operate the clutching mechanisms for causing intermittent driving relation between the oscillating crank shafts and their associated planetary gears by hydraulic means so that mechanical and physical variations between the elements forming each of the clutching mechanisms will have no appreciable effect on the timing of the effective clutch operations.

Other objects and advantages of the invention will be apparent from the following detailed description of preferred forms of embodiments of the invention, reference being made to the accompanying drawings wherein;

Fig. 2 is a view taken substantially on line 2—2 of Fig. 1;

Figs. 3 and 4 are fragmentary views similar to that of Fig. 2 of a portion of the transmission mechanism showing various positions of an eccentrically adjustable cam element;

Fig. 5 is a sectional view showing a clutching mechanism for establishing a driving connection between a crank member and a planetary gear;

Fig. 6 is a view taken on line 6—6 of Fig. 5;

The invention is particularly directed to a variable speed transmission in which a plurality of planetary gears are journalled in a cage secured to a drive or power input shaft, the gears being in constant mesh with a sun gear about which the planetary gears rotate. The sun gear is mounted on the driven or output shaft of the transmission. Each planetary gear is adapted to be intermittently drivingly connected with an oscillating crank shaft by a clutching mechanism as the cage rotates through a predetermined segment of its 360° rotation. The crankshafts are oscillated by the crank arms of the shafts following a circular cam located eccentrically with respect to the axis of rotation of the cage, which axis is coincident to that of the sun gear, the driving or input shaft and the driven or output shaft. This axis is sometimes herein referred to as the axis of the transmission. The crank shafts are not oscillated at uniform harmonic rates during each 180 degrees of each revolution of the cage, but the change in rate will be at a minimum throughout a limited segment of the arc of travel of the cage, and it is during the passage of the respective crank shafts through this segment that the clutching mechanisms are operated to engage the planetary gears with their associated crank shafts. Preferably, the clutching mechanisms are of the disk type and they are each operated by a hydraulic motor carried by the cage. Fluid for actuating the motors is fed to and exhausted from the motors by valving mechanism operated by rotation of the cage. The valving mechanism is formed by a ported sleeve about which the cage rotates to successively pass the openings of individual conduits leading to the respective motors over the ports of the sleeve. The ported sleeve has a fluid inlet port and a fluid outlet port so that the feed and exhaust valving occurs in accordance with rotation of the cage.

In one form of the invention, a valving mechanism is shown incorporating two ported sleeve members which are rotatable about their axes relative to one another and the motors each have two conduits, the opening in one being adapted to pass over the ports of one sleeve and the opening in the other to pass over the port in the second sleeve. By proper angular positioning of these sleeves the arc of travel of the cage through which the clutches are activated can be varied as well as the angular position of such arc about the axis of the transmission.

Figure 1:
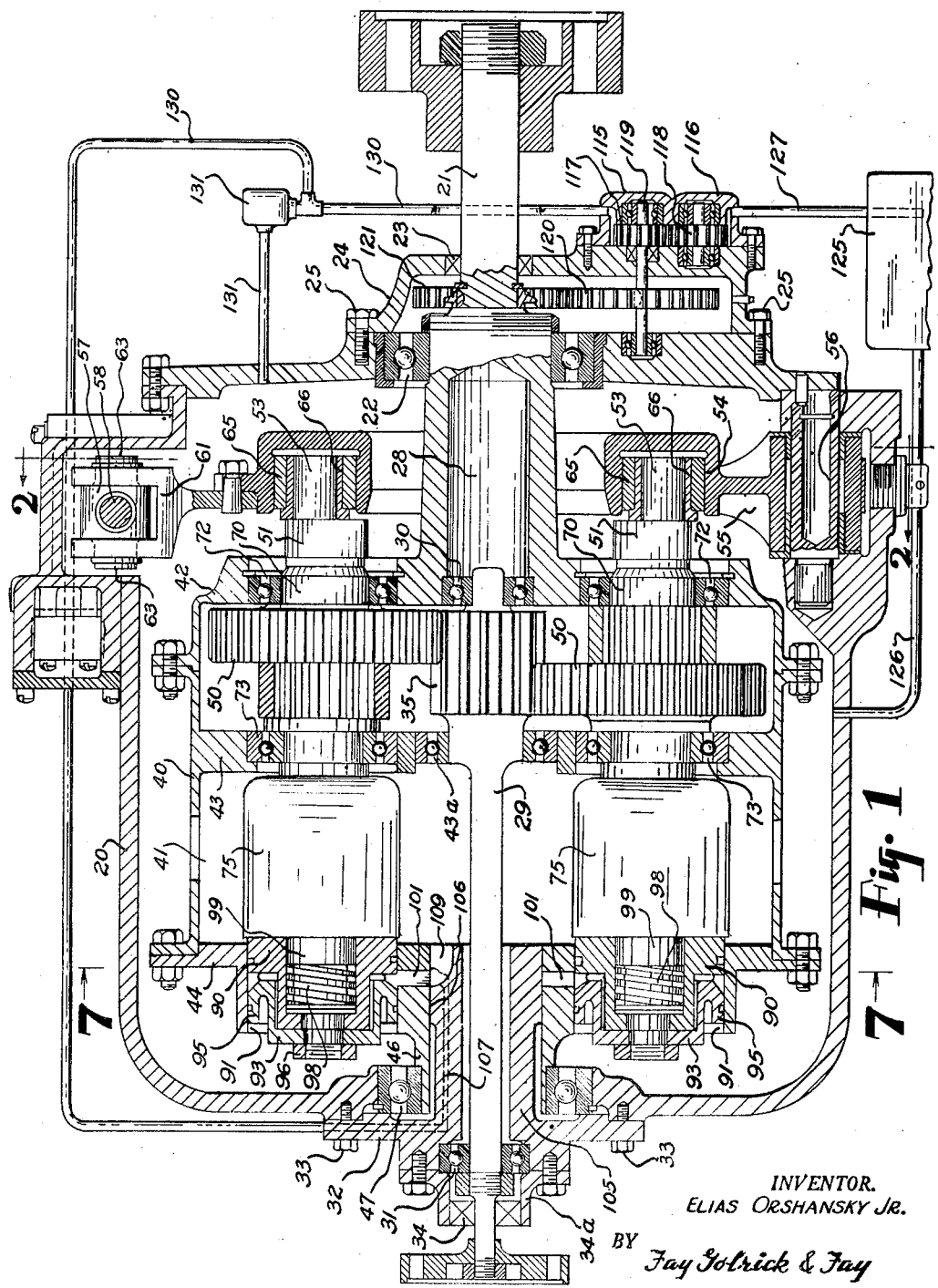
Fig. 1 is a longitudinal view in section of a gear transmission mechanism.

Referring now to Figs. 1 through 3 of the drawings, the transmission includes a housing 20 into one end of which a drive shaft 21 extends, the drive shaft being journalled in a bearing 22 mounted in an opening in a closure plate 24 attached to the end of the housing by bolts 25. An oil seal 23 is positioned between shaft 21 and the opening in the plate 24.

The inner end of the drive shaft 21 is enlarged and bored as at 28, and the bored portion receives the inner end of a driven shaft 29 which extends coaxial with shaft 21 and projects through an opening in the housing. The shaft 29 is journalled at one end in the bore 28 by a bearing 30, and the opposite end is journalled in a bearing 31 supported in an opening in a housing closure plate 32 bolted to the casing 20 by bolts 33, two of which are shown in the drawings. An oil seal 34 is interposed between shaft 29 and a seal plate 34a bolted to plate 32. The driven shaft 29 has a pinion gear 35 at the inner end thereof, which gear constitutes a sun gear adapted to be driven by planetary gears 50 to be described hereinafter.

Attached integrally with the inner end of the drive shaft 21 is a cage 40 that is adapted to be driven by shaft 21 about the axis of the transmission, which is coincident with the axes of shafts 21 and 29. The cage 40 comprises a cylindrical section 41 which is bolted to a flanged end plate 42 that is formed as a part of the drive shaft 21. A second end plate 44 is bolted to the opposite end of the cylinder 41, and the plate 44 includes a centrally located neck portion 46 which projects into the central opening at the left hand end of the housing 20 and is journalled in a bearing 47. A central web 43 is formed integral with the cylinder 41 of cage 40, and the web is provided with a central opening through which the driven shaft 29 extends and a bearing 43a is interposed between the shaft 29 and the wall of the central opening in the web 43 for supporting the cage 40 centrally thereof.

The cage 40 is adapted to carry six planetary gears 50, which gears mesh at all times with the pinion gear 35 of the driven shaft 29. The planetary gears 50 are each mounted on a rocker shaft in the form of a crankshaft 51 which includes a crank arm 52 and a crank pin 53.

The crankpins 53 extend into a circular channel shaped cam 54 that is formed on a frame 55. The frame 55 is pivoted at the bottom by a pin 56 so that it may be swung from one side to the other of the axis of the transmission. The diameter of the cam 54 is the same as that of the arc through which the centers of the crank shafts 51 pass as the cage 40 rotates, and when the frame 55 is vertical, the axis of the cam is coincident with the axis of the transmission, as may be seen in Fig. 3. The angular position of the cam frame about its pivot is controlled by a block 57 threaded on a shaft 58, which shaft is journalled at either end in bearings 59 in the housing 20. The connection between the block 57 and the frame is effected by a bifurcated, forked member 61 at the upper end of the frame 55 and slide blocks 62, only one of which appears in the drawings, received in the bifurcated forks and pivotally secured to the block 57 by pins 63. Thus, a sliding connection is effected between the frame 55 and block 57. The extent of swing of the frame 55 is limited by bolts 64 threaded through the housing.

The crankpins 53 are each journalled in cam follower blocks 65 by bushings 66, and the blocks 65 are adapted to slidingly follow in the cam 54 as the cage 40 is rotated. When the cam 54 is concentric with respect to the axis of the transmission, as shown in Fig. 3, there will be no movement of the crank shafts 51 about their axes as the cage 40 rotates. However, as the cam frame 55 is moved eccentric to the transmission axis, as illustrated in Figs. 2 and 4, the crank shafts will oscillate about their axes by reason of the crank pins following in the cam 54. The rate and direction of oscillation of the crank shafts as the cage 40 passes through any given segment of its arc of rotation, will depend upon the degree and direction, respectively, of eccentricity of the cam 54 with respect to the axis of the transmission. When the cam is on one side of center, this oscillation will be in one direction and when the cam is on the opposite side of center, the oscillation will be in the opposite direction.

Each of the planetary gears 50 is mounted on a splined sleeve 70, as may be seen by referring to Fig. 5, and the sleeve 70 is journalled on the crank shaft 51 by bushings 71 located at opposite ends of the sleeve. The right hand end of the sleeve 70, as viewed in Fig. 5 and shown in Fig. 1, is journalled in a circular opening in the face plate 42 of cage 40 by a roller bearing 72 and the opposite end of the sleeve is similarly journalled in an opening in the web portion 43 of the cylindrical member 41 by a roller bearing 73. A cup shaped clutching member 75 is attached to the left hand end of sleeve 70 by a splined connection indicated at 76, the connection being maintained by a retaining ring 77 threaded on to the end of the sleeve. The outer, internal end portion of the clutch member 75 is provided with longitudinally extending splines 79, and a plurality of annular clutch disks 80, having the peripheries thereof notched, to receive the splines 79, are inserted in member 75 so that they may move in planes normal to the axis of the member 75 and a direction longitudinally of the axis. The splines 79 and notched peripheries of the disks form a torque drive connection between the disks and the clutch member. The crank shaft 51 extends through the central openings of the annular disks 80 and that portion of the crank shaft is splined as indicated at 82. A clutch face plate 83 is splined to the shaft 51 and a series of clutch disks 84 having central openings which are toothed for engaging with the splines 78, are mounted on the splined portion of the crank shaft 51, one of the plates 84 being interposed between two disks 80 so that the disks 80 and 84 are alternate, as may be seen in Fig. 5 of the drawings. The diameter of disks 84 is slightly less than the inside diameter of the clutch member 75. The disks 84 lie in planes parallel with the planes of the disks 80 and they are also movable axially of the crank shaft. It may be pointed out here with the disks 80 and 84 are shown spaced substantially from one another, but it is to be understood that actually these plates are much closer together than is indicated by the drawings. Also, there may be more or less plates than are shown in the drawings. It will be apparent, that by compressing the disks inwardly against plate 83, the disks 80 and 84 will frictionally engage one another to establish a driving connection between the crankshaft and the sleeve 70 on which gear 50 is splined.

The plates 80 and 84 are adapted to be compressed by a hydraulic mechanism for causing the driving connection to be effected between the crank shaft 51 and the sleeve 70, and in the present embodiment the hydraulic means comprises a piston 90 which is adapted to reciprocate in a cylinder 91 formed in the end plate 44 of the cage 40. The piston 90 is provided with a hollow projection 92 which extends into a cylinder head 93, which cylinder head includes a bore 94 and a skirt portion 95 which engages the walls of the cylinder 91. The cylinder head 93 is maintained in place by a nut 96 threaded on the end of the crank shaft 51, and preferably, to prevent the escape of oil between the cylinder head and the cylinder there is an oil ring 97 provided about the skirt portion 95. The piston 90 is constantly urged to the left, to release the clutch disks, by a coil spring 98 mounted about the crank shaft 51 and in the hollow of the piston, one end of which spring abuts a washer 99, which washer in turn abuts the splined portion 82 of the crank shaft, and the opposite end of the spring engages the inner end of the hollow of the piston. It will be noted that there is normally a spacing between the piston 90 and the cylinder head 93. Also, the cylinder head is tapered as at 100, the purpose of which will appear presently.

Each of the cylinders 91 is provided with a port 101 which extends from the cylinders toward the axis of the transmission for receiving and discharging fluid for actuating the clutch disks, as the cage is rotated, as will be more fully explained hereinafter.

The housing closure plate 32 is provided with an internally projecting sleeve portion 105, the internal end of which sleeve is provided with an enlarged portion 106 which forms a bearing surface upon which the sleeved portion 46 of the cage 40 rotates. An oil duct 107 is drilled through the plate 32 and the sleeve 105 and opens into an elongated port 108 (see Fig. 7) extending in a plane normal to the axis of sleeve 105, and which port is in alignment with the ports 101 and constitutes a feed port for the cylinders 91. An elongated port 109 is formed adjacent to the port 108 and in the same plane, and this port opens into the interior of the housing 20. The port 109 forms an exhaust port for the cylinders 91. Thus, oil fed under pressure through the bore 107 will then enter the port 108 and ports 101, as they pass over port 108, to successively actuate the pistons 90 to press clutch disks 80 and 84 into operative engagement during movement of the cage 40 through that segment of its arc of rotation determined by the angular position and arcuate extent of port 108, and during this movement of the cage the planetary gears 50 will be successively connected in driving relation with their corresponding crank shaft 51. As soon as the ports 101 of the clutching mechanisms pass over the port 109 the fluid is released between the piston head and piston and is discharged into the housing 20, and the clutch is thereby released.

It will be noted that the reaction of the force for compressing the clutch disks is borne entirely by the cylinder head 93, and since this head and the plate 83, which receives the thrust against the clutch disks, are mounted on the crank shaft 51, there will be no clutch actuating forces transmitted to any other part of the transmission.

Oil under pressure may be fed to the clutch actuating mechanism by any suitable means by which a substantially constant volume and pressure is supplied, and in the present instance for this purpose I have shown, more or less diagrammatically, a well known gear type pump 115. The casing for the pump includes a portion of closure plate 24 and a cover 116 bolted to the plate. Two intermeshed gears 117 and 118 are mounted within the casing and meshing with one another. Gear 117 is keyed to a shaft 119 which is driven by a gear 120 which in turn is driven by a gear 121 keyed to the drive shaft 21. Oil from the housing 20 is fed to a reservoir 125 through a pipe 126 and the oil from reservoir is drawn through pipe 127 to the pump inlet. Oil discharged from the pump is fed through an oil line 130 to the bore 107. Preferably, a pressure regulator 131 is connected in line 130 and the regulator may discharge oil from line 130 directly into the housing 20 through pipe 132 for limiting the oil pressure in line 130 below a predetermined maximum regardless of pump speed. The pressure regulator 131 may be of any suitable well known type, and it is only shown diagrammatically here.

Figure 7:
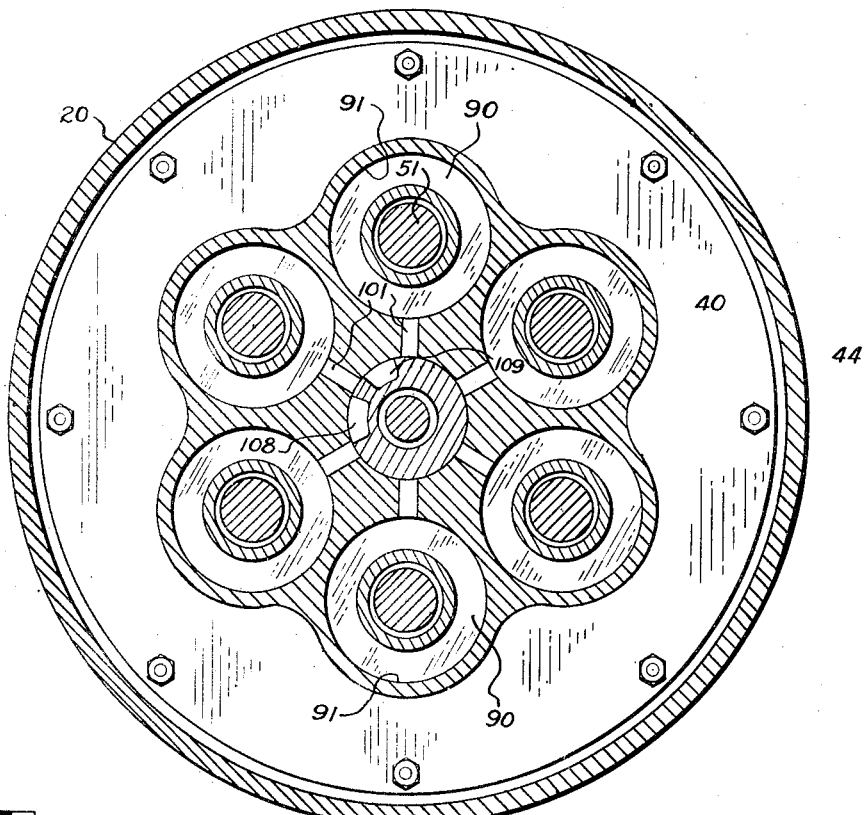
Fig. 7 is a view taken substantially on line 7—7 of Fig. 1.
Figure 8:
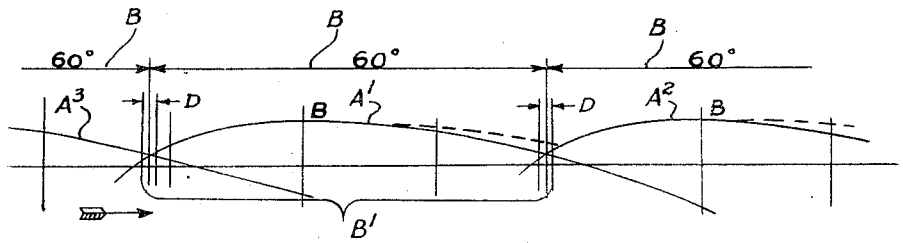
Fig. 8 is a graphic representation of the relative velocities of adjacent crank shafts for driving the planetary gears at the critical engaging and disengaging points of clutching mechanisms between such crank shafts and gears.
Figure 13:
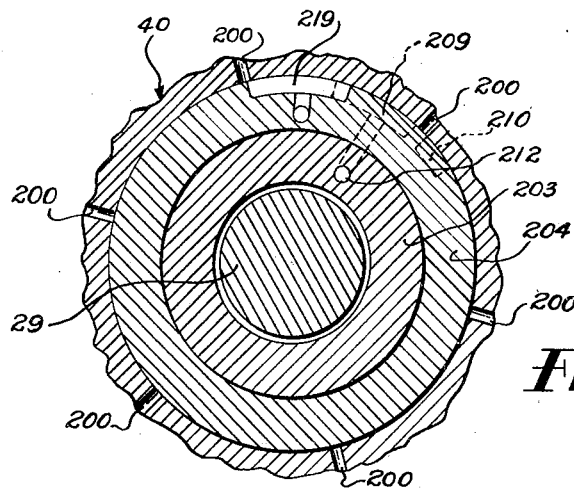
Fig. 13 is a view similar to that of Fig. 12, but showing the certain parts behind the parts shown in Fig. 12.
Figure 9:
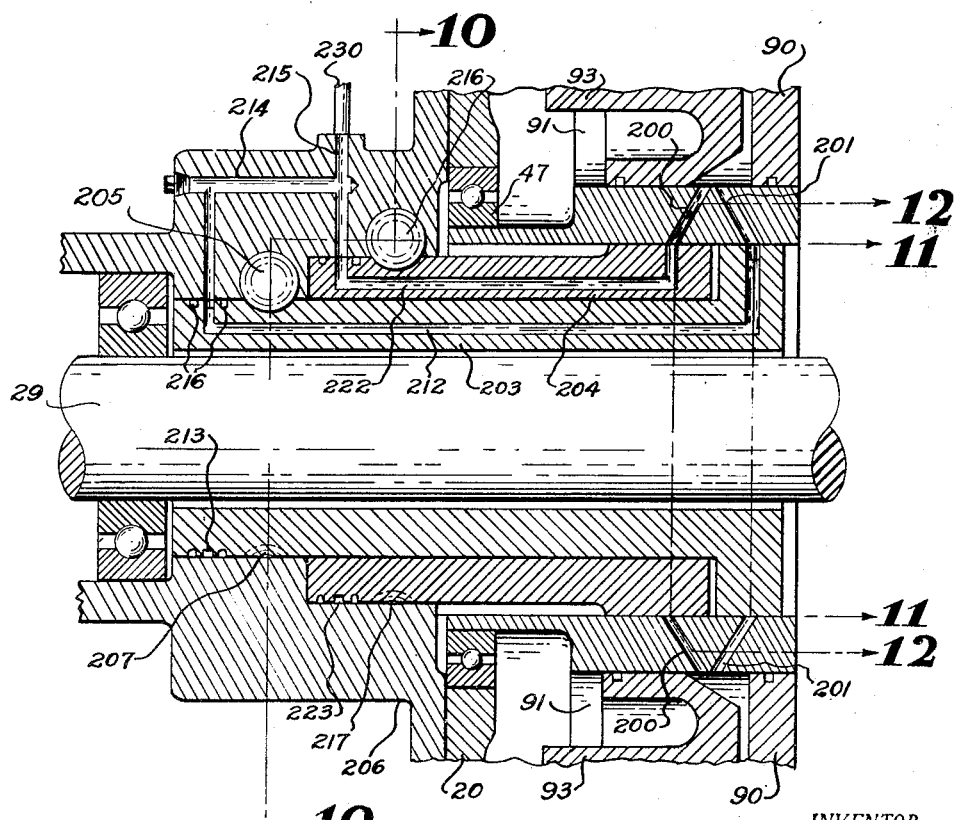
Fig. 9 is a fragmentary view in section showing a second embodiment of the invention in which the mechanism for controlling the clutches may be adjusted.
Figure 10:
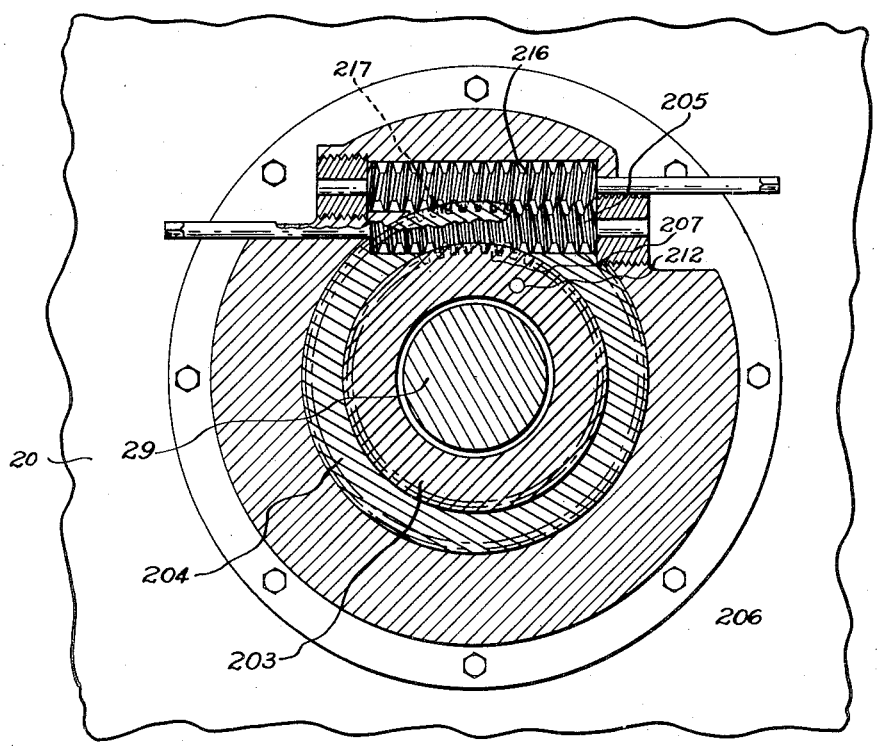
Fig. 10 is a view taken substantially on line 10—10 of Fig. 9.
Figure 11:
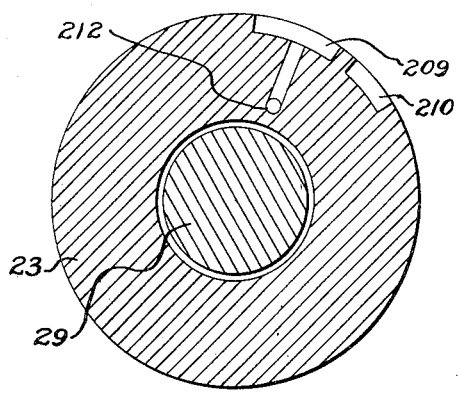
Fig. 11 is a view taken on line 11—11 of Fig. 9.
Figure 12:
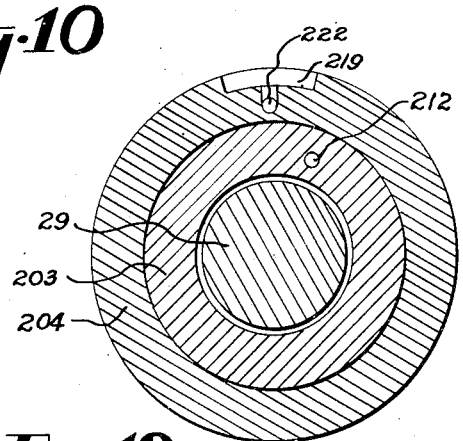
Fig. 12 is a view taken substantially on line 12—12 of Fig. 9.

Referring to the graph shown in Fig. 8, the line $A^1$, represents the speed of rotation of a crank shaft as it approaches and passes through a given 60° segment of the arc of rotation of the cage, and lines $A^2$ and $A^3$ represent the speeds of the crank shaft ahead of and the crank shaft following the crank shaft whose speed is indicated at $A^1$, respectively. The 60° arc represented at B, is located at the sector of the arc of rotation of the cage 40 in which the change in speed of the crank shafts 51 are at a minimum, and it is through this sector that the clutching mechanisms are activated for causing interconnection of the crank shafts with their respective planetary gears. Referring to Fig. 7, assuming that the cage 40 is rotating clockwise, one of the fluid ports 101 will always present an opening over port 108 and before one port 101 is moved to the exhaust port 109, the succeeding port 101 will be in communication with port 108. This causes an overlapping of the action of the succeeding clutch mechanism for effecting a smoother transmission of torque. The clutch for the crank shaft represented at $A^1$ will be engaged throughout approximately 62°, as indicated by the spread $B^1$ and it will be observed that the clutches for the crank shafts represented at $A^2$ and $A^3$ will overlap the operation of the clutch for $A_1$. This overlapping is indicated at D. The inertia of the driven mechanism together with the inherent resiliency of the material from which the transmission is formed will cause the actual speed of the driven parts to follow a line indicated by the dotted lines interconnecting full lines $A^1$, $A^2$ and $A^3$. This indicates that the speed of the output will only partially follow that of the crank shafts.

It is desirable in some instances to vary the overlapping of the clutching mechanisms, according to the speed of the input of the transmission, and it is desirable in some instances to cause angular shifting of the sector in which the clutching actions take place to obtain a more uniform torque transmission from the crank shafts. This may be accomplished by the mechanism shown in Figs. 9 through 13.

In this form of the invention, the cylinders 91 are provided with two conduits 200 and 201 instead of a single conduit, and these two conduits open at spaced points axially of the axis of the transmission. Fluid is fed to these conduits through two concentric sleeves 203 and 204, respectively. Sleeve 203 is axially rotatable and it is normally retained in its desired position by a worm screw 205 journalled in a head plate 206 substituted for plate 32 of the first form of the invention. The sleeve 203 has worm gear teeth formed thereabout as shown at 207 so that the worm screw 205 will position the sleeve axially of the transmission, and by rotating the screw, the sleeve may be adjusted angularly about the axis of the transmission. The inner end of sleeve 203 is enlarged to form a bearing surface for the cage 40, and arcuate inlet and outlet ports 209 and 210, respectively, are formed therein. These ports are in line with the openings to conduits 200 for the cylinders 91 as the cage 40 rotates. Port 209 is fed by a bored passage 212 extending substantially lengthwise of sleeve 203. The outer end of passage 212 opens into a circumferential groove 213 and oil under pressure is fed to groove 213 through a passage 214 connected to the inlet passage 215 to which line 130 is connected. Preferably two oil seal rings 216 are disposed on opposite sides of groove 213. Port 210 exhausts or empties into the housing 20.

Sleeve 204 is mounted on sleeve 203 and it is retained in place by a worm screw 216 journalled in plate 206 and engages worm teeth 217 formed about sleeve 204, which arrangement is similar to that described with reference to sleeve 203. The inner end of sleeve 204 is enlarged for forming a land against which the bore of the cage 40 bears. An arcuate port 219 is formed in the land and this port extends in line with the travel of the ends of conduits 201 of the cylinders 91. The port 219 is fed with oil under pressure through a passage 221 bored in the sleeve 204, and oil is supplied to the passage through a groove 223 extending about the circumference of the sleeve adjacent to its outer end and in alignment with the end of the oil supply passage 215.

It will be apparent that the fluid for operating the clutching mechanisms will be fed to the cylinders 91 through both passages 200 and 201, and the fluid is exhausted by way of port 210. The ports 209 and 219 are shorter than the minimum arc through which it is desired that the clutching mechanisms be actuated but the combined arcuate length is greater than that described so that by positioning the sleeves 203 and 204 at proper angles to one another about their axis, the desired clutch operating arc can be established. For example, sleeve 204 can be positioned by worm screw 216 to the point at which it is desired to actuate the clutching mechanisms and then sleeve 203 can be adjusted by screw 205 to position the sleeve for causing deactivation of the clutching mechanisms at the point desired. Thus, it is possible to readily change the points at which the clutching mechanisms are actuated and released, and this also permits shifting of the segment of the arc of rotation of the cage through which the clutching mechanisms are activated.

It will be understood that the adjustment of the sleeves 203 and 204 could be tied in with the shifting of the cam 54 through suitable mechanism, and also, these sleeves could be adjusted automatically according to the speed of the transmission.

The transmission may be used for producing a variable speed output for a constant speed motor, the output being controlled by the positioning of the cam 54 to give a wide speed range, including zero and reverse. Also, the transmission could be used to provide a constant speed output from a variable speed input. In the latter case, the position of the cam would be controlled according to variation in input speed. Where the input speed varies and hydraulic pressure is furnished by a pump on the input, the capacity of the pump should be such that the desired pressure for actuating the clutching mechanisms will be attained at a relatively low speed of the input shaft, and as the speed increases the excess oil pumped can be relieved by a pressure regulator.

By operating the clutching mechanisms by hydraulic pressure, the operation of the clutches will be uniform regardless of slight mechanical variations in the elements comprising the mechanisms, and by maintaining the oil pressure for actuating the clutches substantially constant, the uniformity and precision of the clutch actuations will remain consistent throughout the range of speed transmission. Also, the activation and deactivation of the hydraulic clutches can be readily adjusted with respect to the angular position of the cage 40.

It will be understood by those skilled in the design of hydraulic mechanisms to be used in association with mechanical devices or machines that oil velocity considerations would require designing of the valving mechanisms hereinbefore described in such manner as to maintain the required velocity of the oil upon opening of the clutch parts to be within practical limits. In one instance where the input speed is to be 2000 R. P. M. the length of passageway 101 should be considerably less than as portrayed in the drawings. Also, the piston clearance space should be maintained at a practical minimum. The pump displacement at the required pressure would be about two and one-half gallons for clutch operating purposes with an excess of about one and one-half gallons to be discharged through the relief valve mechanism.

The oil viscosity should not be high; about an S. A. E. 20 oil rating being preferable. Also, the tank arrangement should be such as to have a reserve of oil which would permit air to escape from the oil. These various considerations and the horse power rating of the clutches, as well as

I claim:

1. In a transmission mechanism, a driven shaft having a gear thereon; a drive shaft; a planetary gear meshing with the gear on the driven shaft; a support for the planetary gear, said support being rotatable by the drive shaft for moving the planetary gear about the gear on the driven shaft; a rocker shaft associated with the planetary gear; means for oscillating said rocker shaft when said support is rotated; hydraulically operated means for effecting driving connection between said rocker shaft and planetary gear intermittently for causing said rocker shaft to drive the planetary gear; and a valve mechanism driven by said drive shaft for controlling said hydraulic means.

2. In a transmission mechanism, a driven shaft having a sun gear thereon; a drive shaft; a planetary gear meshing with the gear on the driven shaft; a support for the planetary gear, said support being rotatable by the drive shaft for moving the planetary gear about the gear on the driven shaft; a rocker shaft associated with the planetary gear; means for oscillating said rocker shaft when said support is rotated; hydraulically operated means for effecting driving connection between said rocker shaft and planetary gear intermittently for causing said rocker shaft to drive the planetary gear; a hydraulic pump driven by said drive shaft; and a valve mechanism driven by said drive shaft for controlling the flow of fluid from said pump to said hydraulic means.

3. In a transmission mechanism, a casing; a driven shaft having a gear thereon in the casing; a driven shaft; a cage in the casing and driven by said driving shaft about an axis coincident to the axis of the driven shaft; a plurality of planetary gears mounted in said cage and meshing with the gear on the driven shaft; a plurality of rocker shafts associated with said planetary gears, respectively; means for oscillating said rocker shafts when the cage is rotated; hydraulically operated means for connecting said rocker shafts in engagement with their respective planetary gears; a source of hydraulic fluid under pressure; and means for controlling operation of said hydraulically operated means by said hydraulic fluid, including, an arcuate slot formed in a port of the casing and a ported member carried by the cage, the port being moved into and out of registry with said slot as the cage rotates.

4. In a transmission mechanism, a casing; a driven shaft mounted in said casing and having a gear thereon; a cage in the casing and rotatable about the axis of the driven shaft; a plurality of planetary gears carried by said cage and meshing with said driven gear; a plurality of rocker shafts associated with said planetary gears, respectively, said rocker shafts extending through the hubs of the respective planetary gears and forming journals for said planetary gears; means for oscillating said rocker shafts when the cage is rotated; tubular members surrounding said rocker shafts and being connected to said gears; pressure actuated clutch means between said rocker shafts and the respective tubular members, said cage having cylinders into which the end portions of said rocker shafts extend, respectively; a head connected to each of said end portions for closing one end of the cylinders; an annular piston surrounding said portion, said piston being adapted to actuate said clutch means when moved by fluid between the piston and head; and means for directing fluid under pressure between said piston and head during a predetermined angular movement of said cage.

5. In a gear transmission, a sun gear, a cage carrying a plurality of planetary gears in mesh with the sun gear; means for driving each planetary gear comprising, a tubular member connected with such planetary gear; a rocker shaft within said member and extending coaxial therewith; means for oscillating said rocker shaft when the cage is rotated; a plurality of clutch disks between the walls of the tubular member and the rocker shaft, said disks being disposed in planes normal to the axis of the rocker shaft and being movable longitudinally of the rocker shaft and tubular member, alternate disks being keyed to the walls of the tubular member and the disks intermediate the alternate disks being keyed to the rocker shaft, said cage having cylinders formed therein axially aligned with the rocker shafts, respectively; a piston in each cylinder adapted to act laterally against said disks for causing frictional engagement between the latter; and means for intermittently actuating said piston.

6. In a gear transmission, a sun gear, a cage carrying a plurality of planetary gears in mesh with the sun gear; means for driving each planetary gear comprising, a tubular member connected with such planetary gear; a rocker shaft within said member and extending coaxial therewith; means for oscillating said rocker shaft when the cage is rotated; a plurality of clutch disks between the walls of the tubular member and the rocker shaft, said disks being disposed in planes normal to the axis of the rocker shaft and being movable longitudinally of the rocker shaft and tubular member; alternate disks being keyed to the walls of the tubular member and the disks intermediate the alternate disks being keyed to the rocker shaft, said cage having cylinders formed therein axially aligned with the rocker shafts, respectively; a piston in each cylinder adapted to act laterally against said disks for causing frictional engagement between the latter; and means controlled by rotation of said cage for intermittently actuating said piston.

7. In a gear transmission, a sun gear, a cage carrying a plurality of planetary gears in mesh with the sun gear; means for driving each sun gear comprising, a tubular member connected with such planetary gear; a rocker shaft within said member and extending coaxial therewith; means for oscillating said rocker shaft when the cage is rotated; a plurality of clutch disks between the walls of the tubular member and the rocker shaft, said disks being disposed in planes normal to the axis of the rocker shaft and being movable longitudinally of the rocker shaft and tubular member; alternate disks being keyed to the walls of the tubular member and the disks intermediate the alternate disks being keyed to the rocker shaft, said cage having cylinders formed therein axially aligned with the rocker shafts, respectively, one end of said rocker shafts extending into the respective aligned cylinders; a cylinder head attached to said end of each of the rocker shafts; a piston in each cylinder slidable on the rocker shaft and adapted to act laterally against said disks for causing frictional engagement between the latter; and means for intermittently directing fluid under pressure between the cylinder head and piston.

8. In a gear transmission, a housing, a sun gear in the housing; a cage carrying a plurality of planetary gears in mesh with the sun gear; means for driving each planetary gear comprising, a tubular member connected with such planetary gear; a rocker shaft within said member and extending coaxial therewith; means for oscillating said rocker shaft when the cage is rotated; a plurality of clutch disks between the walls of the tubular member and the rocker shaft, said disks being disposed in planes normal to the axis of the rocker shaft and being movable longitudinally of the rocker shaft and tubular member; alternate disks being keyed to the walls of the tubular member and the disks intermediate the alternate disks being keyed to the rocker shaft, said cage having cylinders formed therein axially aligned with the rocker shafts, respectively, one end of said rocker shafts extending into the respective aligned cylinders; a cylinder head attached to said end of each of the rocker shafts; a piston in each cylinder slidable on the rocker shaft and adapted to act laterally against said disks for causing frictional engagement between the latter; a ported member carried by said housing, said cage having a portion slidingly engaged with said ported member and having a bore leading from each of said cylinders to the surface engaging the ported member, said ported member having a port for supplying fluid to said bores and a port for exhausting fluid from said bores, said bores being movable into and out of registration with said ports, successively, as said cage is rotated; and means for supplying fluid under pressure to the first mentioned port.

9. In a gear transmission, a cage; a driven gear; a plurality of planetary gears carried by the cage and in mesh with said driven gear, said cage being adapted to revolve about said driven gear; a plurality of rocker shafts, one associated with each of said planetary gears; means for oscillating said rocker shafts when the cage is rotated; clutching means for connecting said planetary gears in driving connection with their respective rocker shafts; hydraulic motors carried by said cage for actuating said clutches; means for supplying fluid under pressure to said motors including, a pair of ported members mounted on a common axis and each having an elongated port at the peripheries thereof and extending in a plane normal to said axis, said ports being spaced along said axis, each of said fluid motors having two fluid conduits, one conduit having its opening disposed in said plane of one of said ports and the other conduit having its opening in the plane of the other of said ports whereby said conduit openings sweep over said ports, respectively as the cage is rotated; and means for adjusting the angular position of said ported members about said axis.

10. In a gear transmission, a cage; a driven gear; a plurality of planetary gears carried by the cage and in mesh with said driven gear, said cage being adapted to revolve about said driven gear; a plurality of rocker shafts, one associated with each of said planetary gears; means for oscillating said rocker shafts when the cage is rotated; clutching means for connecting said planetary gears in driving connection with their respective rocker shafts; hydraulic motors carried by said cage for actuating said clutches; means for supplying fluid under pressure to said motors including, a pair of ported members mounted on a common axis and each having an elongated port at the peripheries thereof and extending in a plane normal to said axis, said ports being spaced along said axis, each of said fluid motors having two fluid conduits, one conduit having its opening disposed in said plane of one of said ports and the other conduit having its opening in the plane of the other of said ports whereby said conduit openings sweep over said ports, respectively as the cage is rotated; and means for adjusting the angular position of said ported members about said axis, said members being adjustable independently of one another.

11. In a gear transmission, a cage; a driven gear; a plurality of planetary gears carried by the cage and in mesh with said driven gear, said cage being adapted to revolve about said driven gear; a plurality of rocker shafts, one associated with each of said planetary gears; means for oscillating said rocker shafts when the cage is rotated; clutching means for connecting said planetary gears in driving connection with their respective rocker shafts; hydraulic motors carried by said cage for actuating said clutches; means for supplying fluid under pressure to said motors including, a pair of ported members mounted on a common axis and each having an elongated port at the peripheries thereof and extending in a plane normal to said axis, said ports being spaced along said axis, one of said members having a second port lying in said plane normal to said axis and being spaced angularly from the other port of said one ported member; each of said fluid motors having two fluid conduits, one conduit having its opening disposed in said plane of one of said ports and the other conduit having its opening in the plane of the other of said ports whereby said conduit openings sweep over said ports, respectively as the cage is rotated; and means for adjusting the angular position of said ported members about said axis.

12. In a gear transmission, a cage; a driven gear; a rocker shaft journalled in said cage; a planetary gear carried by the cage and in mesh with the driven gear; means for oscillating said rocker shaft when the cage is rotated; a clutch on the rocker shaft for connecting the rocker shaft and planetary gear; and means for actuating said clutch including, a cylinder, a cylinder head connected to the rocker shaft, a clutch member connected to the rocker shaft and spaced from the cylinder head, a piston intermediate the cylinder head and clutch member, and means for admitting fluid under pressure intermediate the cylinder head and piston.

ELIAS ORSHANSKY, Jr.

REFERENCES CITED

The following references are of record in the file of this patent:

UNITED STATES PATENTS

| Number | Name | Date |
|---|---|---|
| 1,457,062 | Henriod | May 29, 1923 |
| 1,624,835 | Hatcher | Apr. 12, 1927 |
| 1,732,247 | Tornberg | Oct. 22, 1929 |
| 2,187,835 | Martin | Jan. 23, 1940 |
| 2,417,944 | Osborne | Mar. 25, 1947 |